(12) United States Patent
Arnaout et al.

(10) Patent No.: US 6,694,281 B2
(45) Date of Patent: Feb. 17, 2004

(54) REAL TIME SIGNAL ANALYSIS OF A REMOTE BLOCK DATA STORAGE DEVICE

(75) Inventors: Badih M. Arnaout, Loveland, CO (US); Michael G. Magill, Olthe, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 44 days.

(21) Appl. No.: 10/127,255

(22) Filed: Apr. 22, 2002

(65) Prior Publication Data

US 2003/0014209 A1 Jan. 16, 2003

Related U.S. Application Data

(60) Provisional application No. 60/305,291, filed on Jul. 12, 2001.

(51) Int. Cl.$^7$ .............................................. G01M 19/00
(52) U.S. Cl. ........................ 702/122; 365/45; 711/162
(58) Field of Search ................... 702/122, 108, 702/186; 714/699, 718; 365/189.05, 200, 305, 45; 711/162, 147, 152, 161

(56) References Cited

U.S. PATENT DOCUMENTS

| | | |
|---|---|---|
| 5,903,626 A | 5/1999 | Iglehart et al. |
| 5,966,428 A | 10/1999 | Ortiz Perez et al. |
| 6,041,287 A | 3/2000 | Dister et al. |
| 6,085,244 A | 7/2000 | Wookey |
| 6,175,934 B1 | 1/2001 | Hershey et al. |
| 6,253,163 B1 | 6/2001 | Lapie |
| 6,325,540 B1 | 12/2001 | Lounsberry et al. |
| 6,351,828 B1 | 2/2002 | Frimodig et al. |
| 6,362,730 B2 | 3/2002 | Razavi et al. |
| 6,618,795 B2 * | 9/2003 | Chan et al. ................ 711/162 |

* cited by examiner

*Primary Examiner*—John Barlow
*Assistant Examiner*—Meagan S Walling
(74) *Attorney, Agent, or Firm*—Fellers, Snider, et al.

(57) ABSTRACT

Method and apparatus for remote data acquisition from a block data storage device having a data storage medium, a host interface port, a serial communication (COM) port and a programmable controller with associated platform firmware and associated diagnostic firmware. A client computer and a server computer are connected to a computer network (such as the Internet), and the data storage device is connected to the server computer via the host interface port. A data acquisition device such as a disk drive analyzer having digital oscilloscope capabilities is connected to the server computer and the data storage device. Requests from the client computer are transmitted via the network to result in a first command to the data storage device to execute the platform firmware and a second command to capture a waveform signal from the data storage device. The waveform signal is transmitted real time for display by the client computer.

16 Claims, 8 Drawing Sheets

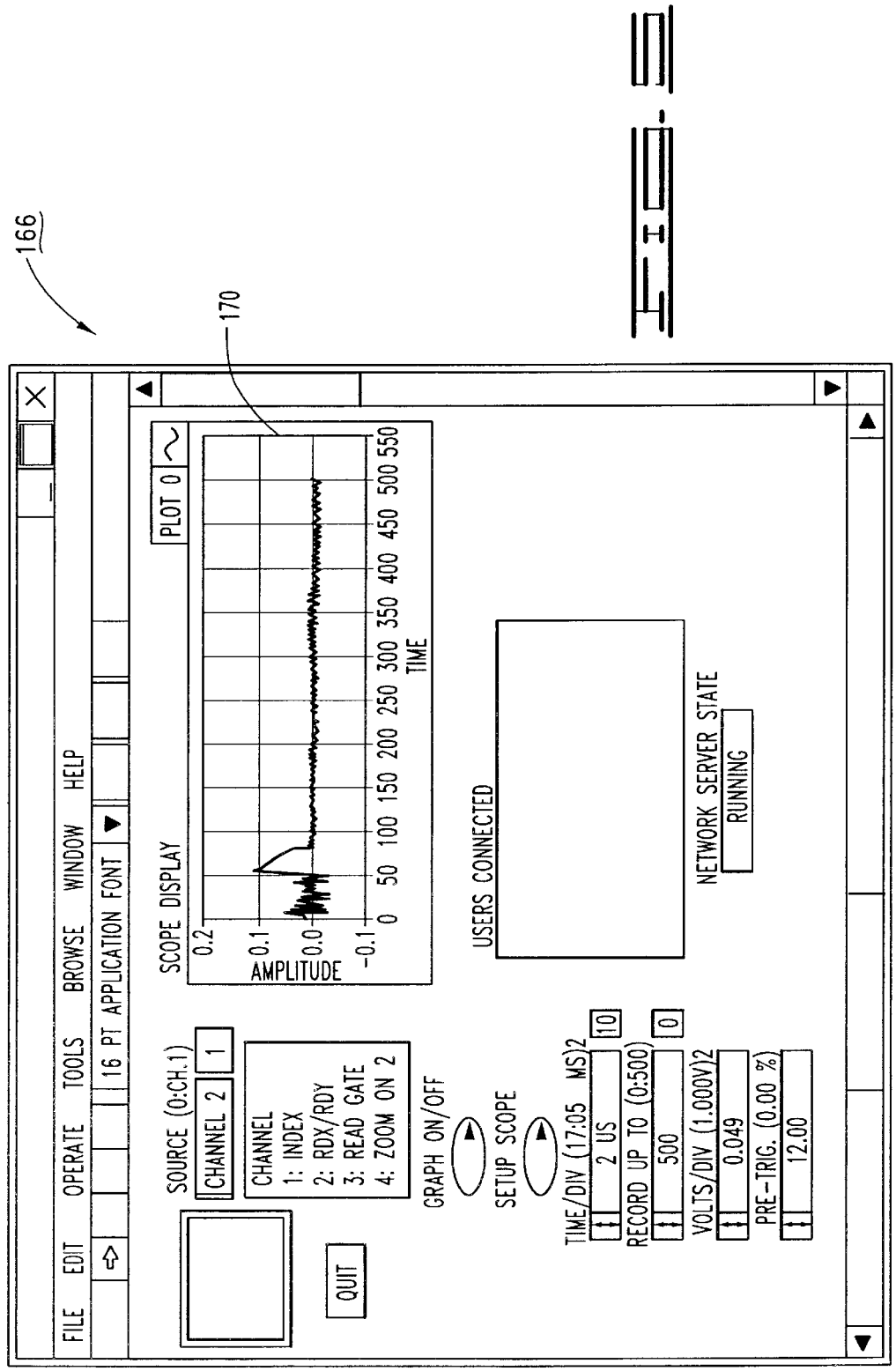

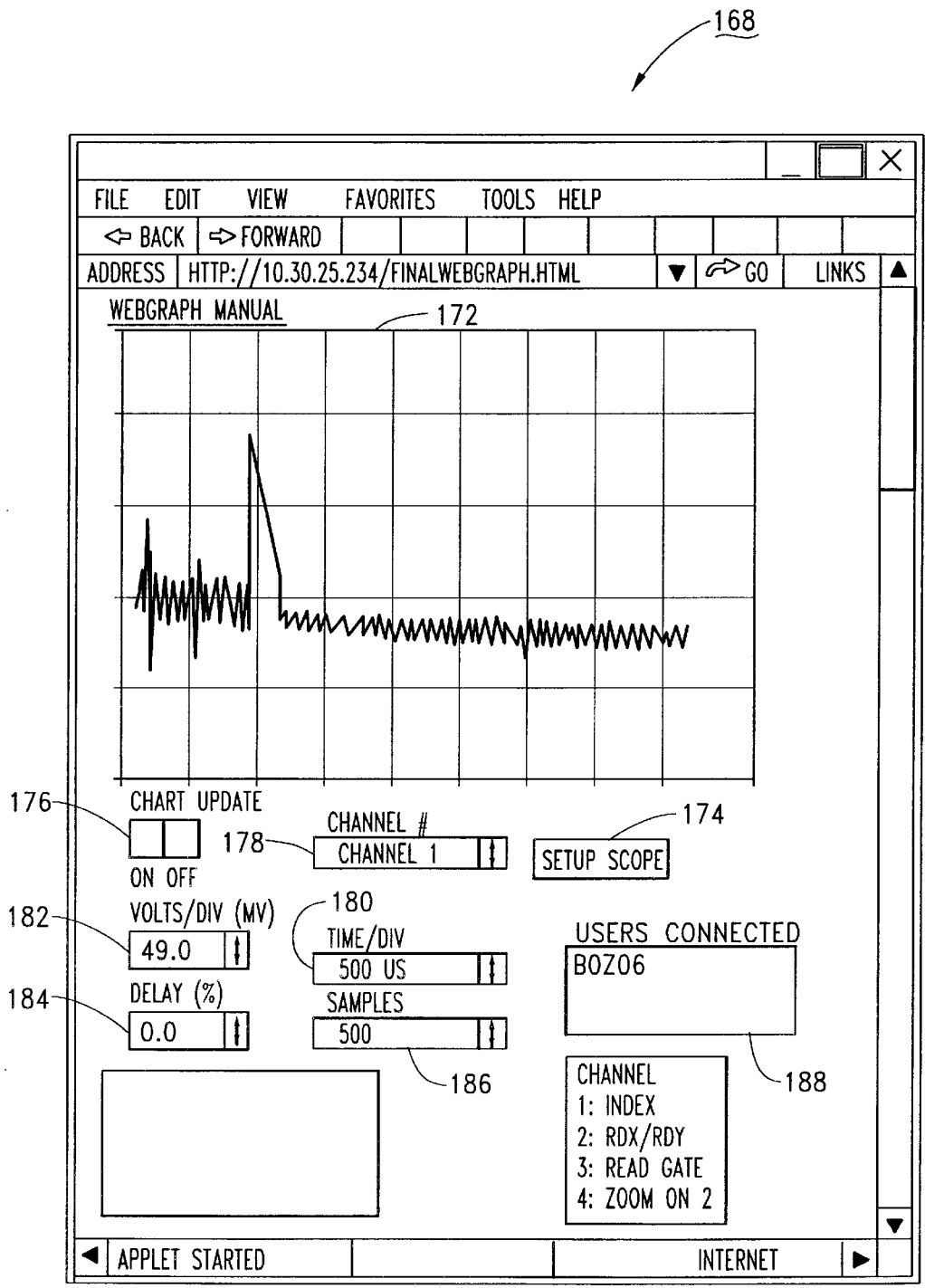

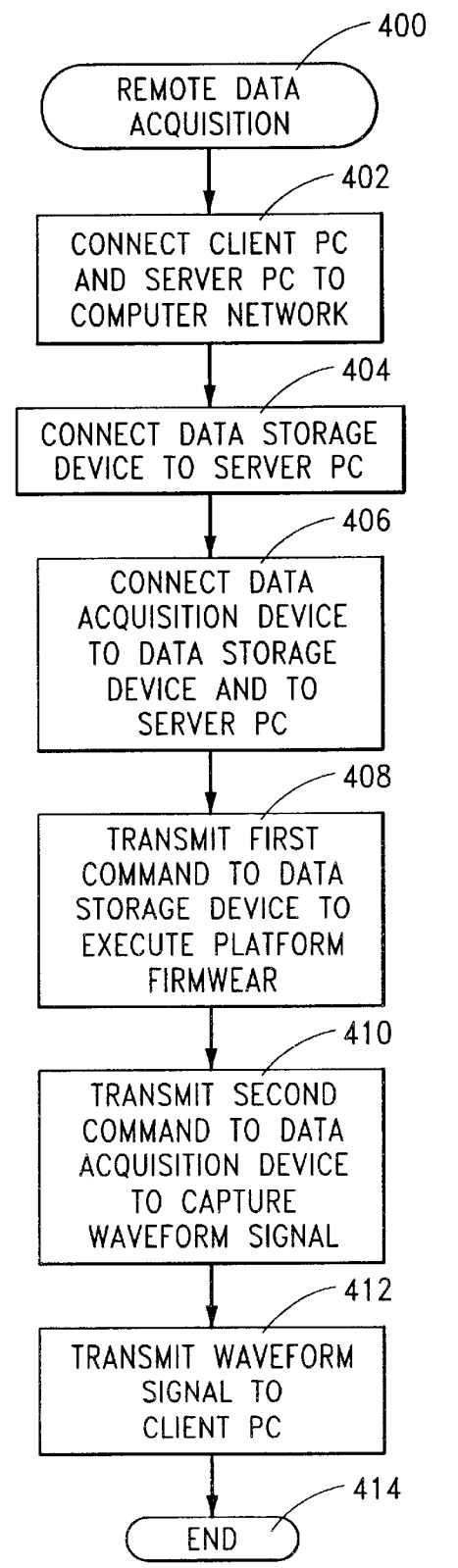
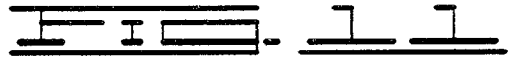
FIG. 11

REAL TIME SIGNAL ANALYSIS OF A REMOTE BLOCK DATA STORAGE DEVICE

RELATED APPLICATIONS

This application claims priority to U.S. Provisional Application No. 60/305,291 filed Jul. 12, 2001.

FIELD OF THE INVENTION

The claimed invention relates generally to the field of digital data storage and more particularly, but not by way of limitation, to an apparatus and method for performing real time signal analysis and control of a data storage device over a computer network, such as the Internet.

BACKGROUND

Block data storage devices store and/or retrieve digital data in the form of blocks, which are individually addressable by a host device. Exemplary block data storage devices include hard disc drives, optical disc recorders and players, and magnetic digital tape recorders and players.

Such devices typically comprise a hardware/firmware based interface circuit, a communication channel and a recordable medium. The interface circuit includes a buffer for the temporary storage of transferred data and a programmable controller that provides top level control of the device. The user memory space of the recording medium is divided into a number of addressable blocks which are assigned host-level addresses (sometimes referred to as logical block addresses or LBAs). Each LBA typically has a corresponding physical block address (PBA) used by servo control circuitry to align a data transducing head with the appropriate portion of the medium to access the desired LBA.

To write data to the medium, the host device issues a write command comprising the user data to be stored by the storage device along with a list of LBAs to which the user data are to be stored. The storage device temporarily stores the user data in the buffer, schedules movement of the data transducing head to the appropriate location(s) over the medium, and then uses write channel portions of the communication channel to apply the appropriate encoding and conditioning of the data to write the data to the selected LBAs.

To subsequently read the data from the storage device, the host device issues a read command identifying the LBAs from which data are to be retrieved. The storage device schedules movement of the data transducing head to the appropriate location(s) over the medium, and then uses read channel portions of the communication channel to decode readback data which are placed into the buffer for subsequent transfer back to the host device. Such host-device data transfers are typically accomplished through a host interface port configured in accordance with an industry standard protocol such as ATA, SCSI, etc.

The controller uses operational programming ("platform firmware") to manage the overall operation of the device. The platform firmware is typically stored in an integrated circuit memory device accessible by the controller during operation. The memory device further typically stores diagnostic firmware comprising programming that allows a user to monitor the operation of the platform firmware and diagnose error conditions. The diagnostic firmware is often configured to be accessed though a separate communications (COM) port using a serial connection to the device.

In the past, diagnostic evaluation of a device (such as during design or manufacturing) has typically required connecting the device directly to a host computer and installing special communication software on the host computer that allows the user to access the COM port and execute the diagnostic firmware. A specially configured data acquisition device (such as a digital oscilloscope or analyzer) can be also directly connected to the device (such as through test pins) to access desired signal waveforms such as high frequency readback signals from a preamplifier circuit of the device as the drive is operated.

Limitations associated with this approach include the fact that in today's environment device manufacturers can have manufacturing and design facilities scattered throughout the world. Thus, if the expertise required to diagnose a particular device condition is at a different location than the device, it is necessary to either ship the device to another location or require an engineer or other personnel to travel to the site at which the device is located in order to observe the operation of the device in the environment in which the error condition has occurred.

Similar concerns are also encountered when error conditions are exhibited with devices at customer sites. Field technical personnel are often required to visit the customer site and bring the necessary equipment to observe and evaluate the device, interrupting the customer's operations and delaying the restoration of service to the customer.

As the time windows available to bring new generations of devices to market continue to decrease and as customer expectations for high device availability continue to increase, there is a continual need for improvements in the art to allow users to quickly and accurately diagnose error conditions associated with data storage devices.

SUMMARY OF THE INVENTION

In accordance with preferred embodiments, a method and apparatus are provided for remote data acquisition from a block data storage device such as a disc drive. The data storage device includes a data storage medium, a host interface port, a serial communication (COM) port and a programmable controller with associated platform firmware and associated diagnostic firmware.

A client computer and a server computer are connected to a computer network (such as the Internet), and the data storage device is connected to the server computer via the host interface port. A data acquisition device such as a disk drive analyzer having digital oscilloscope capabilities is connected to the server computer and the data storage device.

Requests from the client computer are transmitted via the network to result in a first command to the data storage device to execute the platform firmware and a second command to capture a waveform signal from the data storage device. The waveform signal is transmitted real time for display by the client computer. Preferably, the client computer operates using a Java compatible web browser and addresses the server computer using hypertext transfer protocol (http).

In a preferred embodiment, a test interface daughter board is connected to test nodes (pins) of the data storage device, to the server computer and to the data acquisition device. The board includes selection logic to allow the user of the client computer to automatically select the test node(s) from which the waveform signal is to be generated.

These and various other features and advantages that characterize the claimed invention will be apparent upon reading the following detailed description and upon review of the associated drawings.

BRIEF DESCRIPTION OF THE DRAWINGS

FIG. 5 is a display provided to the server PC shown in FIG. 3.

FIG. 6 is a display provided to the client PC shown in FIG. 3.

FIG. 11 is a flow chart for a REMOTE DATA ACQUISITION routine.

DETAILED DESCRIPTION

Figure 1:
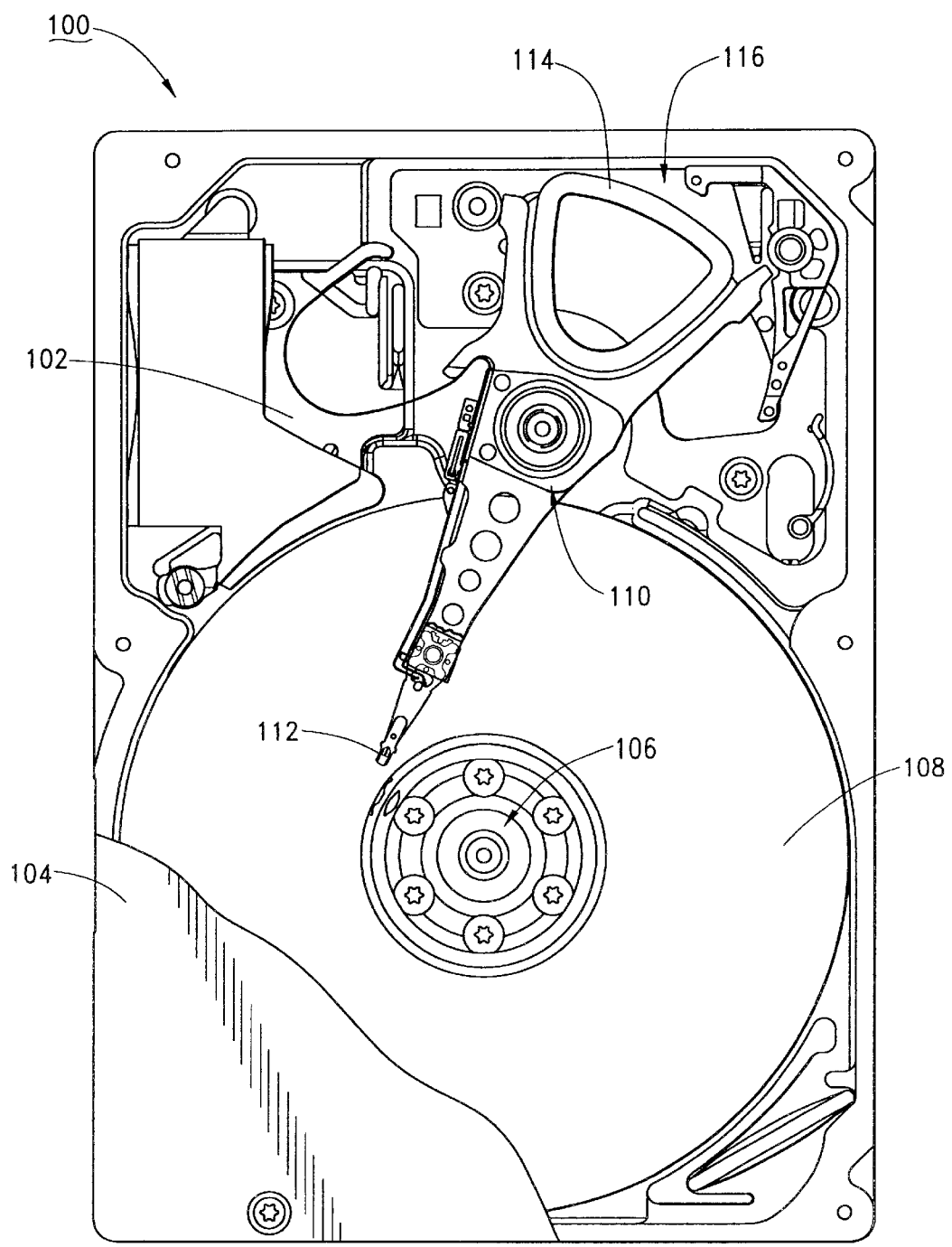
FIG. 1 is a plan view of a disc drive block data storage device constructed and operated in accordance with preferred embodiments of the present invention.

Referring now to the drawings, FIG. 1 provides a top plan view of a disc drive block data storage device 100 ("disc drive"). A base deck 102 cooperates with a top cover 104 (shown in partial cutaway) to provide a sealed housing for the drive.

Components supported within the housing include a spindle motor 106 which rotates a number of recording discs 108 at a constant high speed, and an actuator assembly 110 which supports a corresponding number of data transducing heads 112 adjacent the discs 108. The actuator assembly is rotated about an actuator axis through application of current to a coil 114 of a voice coil motor (VCM) 116. The heads 112 store data on a number of concentric tracks (not separately shown) defined on the discs 108.

Figure 2:
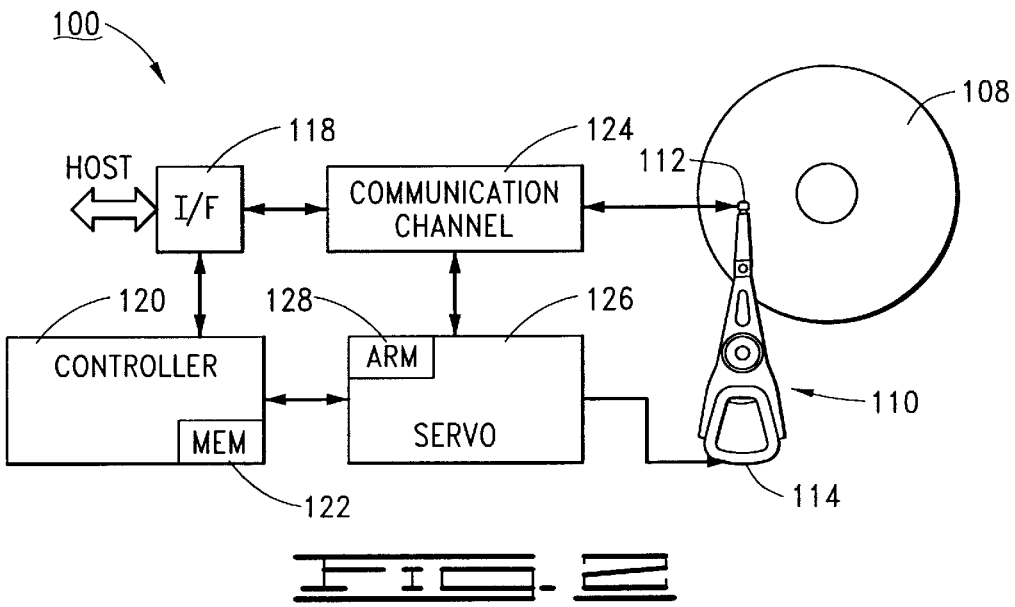
FIG. 2 is a functional block diagram of the disc drive of FIG. 1.

FIG. 2 provides a simplified functional block diagram of command and control electronics of the disc drive 100. These electronics are primarily on a disc drive printed circuit board (PCB) mounted to the underside of the base deck 102, and are thus not visible in FIG. 1. A hardware based interface (I/F) circuit 118 communicates with a host device and includes a buffer to temporarily store user data during transfers between the host and the discs 108. A programmable controller (processor) 120 uses programming steps stored in an associated memory device 122 to provide top level control of the disc drive 100. As discussed in greater detail below, the memory device 122 stores platform firmware used during normal disc drive operation and diagnostic firmware used to monitor and diagnose operation of the drive.

A communications channel 124 conditions input user data to provide write signals to the heads 112 to write data to the discs 108 during a write operation and conditions readback signals transduced by the heads 112 to reconstruct user data from the discs 108 during a read operation. A servo control circuit 126 provides closed loop servo positioning control of the heads 112 and includes a programmable servo processor 128, which preferably comprises an ARM processor (Advanced Reduced-Instruction-Set-Computer (RISC) Machine).

Figure 3:
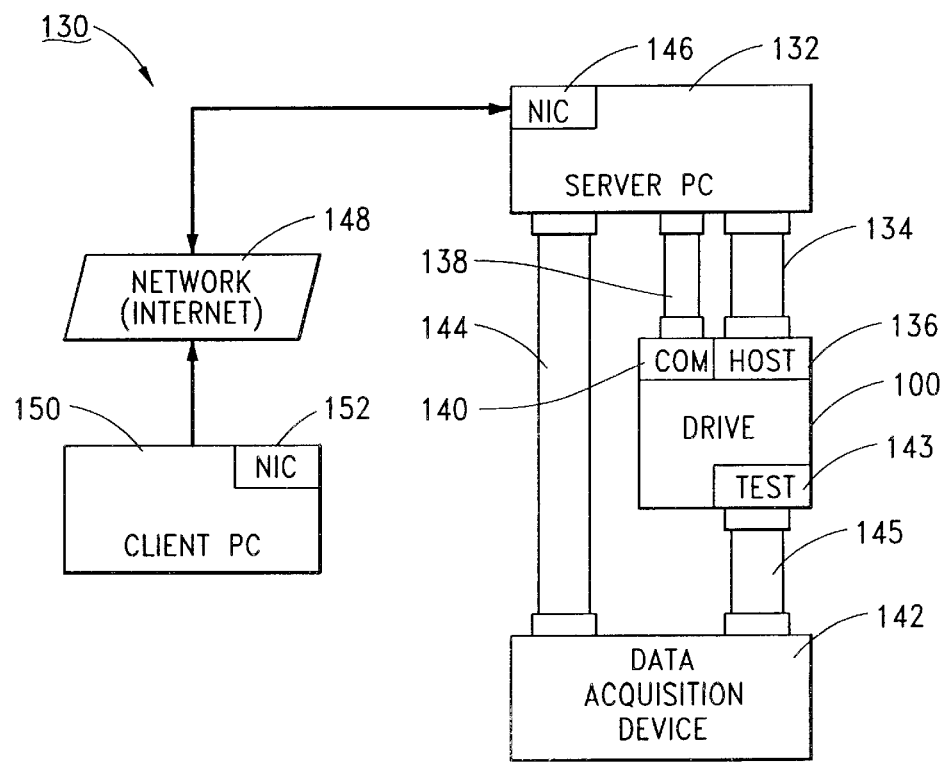
FIG. 3 is a functional block diagram of a remote access system constructed and operated in accordance with preferred embodiments of the present invention.

FIG. 3 provides a functional block diagram of a remote access system 130 constructed and operated in accordance with various preferred embodiments of the present invention. The disc drive 100 is directly connected to a first computer 132 (preferably comprising a personal computer (PC) and referred to herein as the server PC). A host interface cable 134 provides access by the server PC 132 to a host port 136 of the disc drive 100, and a serial cable 138 provides access to a universal asynchronous receiver transmitter (UART) communication (COM) port 140. It will be understood, however, that the COM port 140 can be alternatively accessed through the host interface cable 134.

A data acquisition device (DAD) 142 is used to obtain data from the device at a relatively high sampling rate through a specially configured test interface 143 (such as an array of test pins) and test cabling 145. The DAD 142 can take any of a number of desired forms, including but not limited to an oscilloscope, a frequency analyzer or a data acquisition card incorporated within the server PC 132. In a preferred embodiment, the DAD 142 comprises a disk drive analyzer unit commercially available from LeCroy Corporation, Model DDA 5005. Commands and data are exchanged between the DAD 142 and the server PC 132 via GPIB (general purpose interface bus) cable 144.

The server PC 132 further includes a network interface card (NIC) 146 comprising a cable modem or similar communication device configured to enable the server PC 132 to communicate with a computer network 148. In a preferred embodiment, the computer network 148 comprises the Internet and communication is carried out using transmission control protocol/Internet protocol (TCP/IP). A second computer 150 (also preferably comprising a PC and referred to as the client PC) communicates with the network 148 via NIC 152.

The server PC 132 is loaded with specially configured software (referred to herein as WebGraph™ software) which, as discussed in detail below, enables a user of the client PC 150 to access the disc drive 100 and the DAD 142 using a Java compatible web browser (such as Microsoft Internet Explorer® commercially available from Microsoft Corporation). A user can configure the DAD 142 as desired and receive any available channel from the DAD 142.

Figure 4:
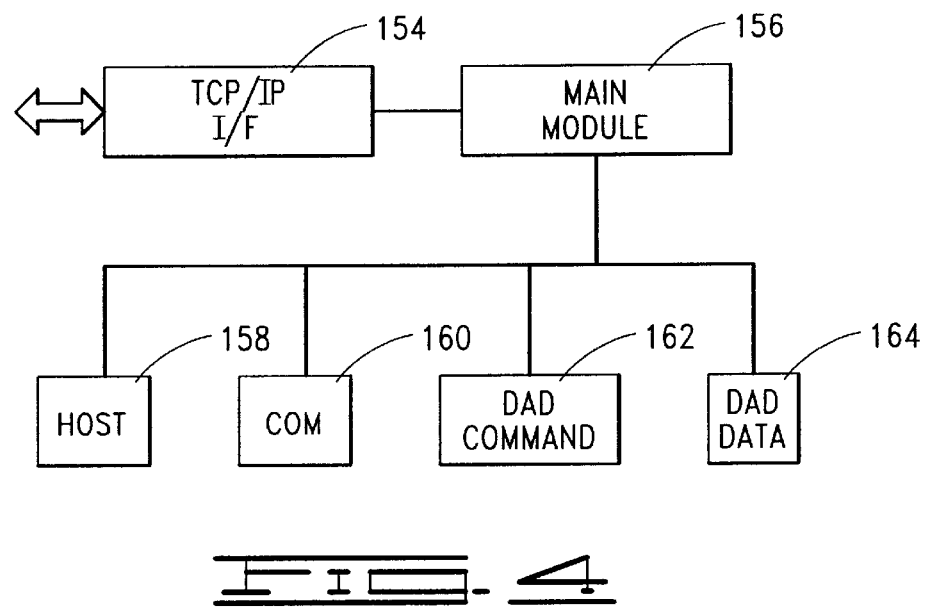
FIG. 4 is a top level block diagram of control software loaded into memory of the server PC of FIG. 3.

The software has a general format as shown in FIG. 4. A TCP/IP interface block 154 interfaces with the network 148. The I/F block 154 parses and forwards commands received over the network 148 to a main module 156, which coordinates overall control of commands and data. The software communicates with the disc drive 100 to execute the platform firmware via host interface module 158 and, as desired, communicates with the disc drive 100 via the COM port 140 to execute the diagnostic firmware via COM interface module 160. A DAD command module 162 communicates commands to the DAD 142, and a DAD data module 164 coordinates transfer of acquired data from the DAD 142 for display by the server PC 132 and transfer over the network for concurrent display by the client PC 150.

FIG. 5 shows the general format of a display 166 provided to a monitor of the server PC 132, and FIG. 6 shows a corresponding display 168 that is concurrently provided to a monitor of the client PC 150. The displays 166, 168 are preferably generated using Lab View software commercially available from National Instruments Corporation and are configured to have informational and control fields suitable for the particular configuration of the DAD 142.

A high frequency waveform obtained from the DAD 142 is concurrently displayed in respective scope display windows 170, 172. Various DAD configuration settings selected by the user of the client PC 150 are further displayed on the server display 166. With reference to FIG. 6, these settings include a Setup Scope button 174, a Chart Update switch 176, a Channel # field 178, a Time/Div field 180, Volts/Div field 182, a Delay % field 184, a Samples field 186 and a Users Connected field 188.

Hitting the Setup Scope button 174 causes the software to configure the DAD 142 for the recommended connections. This allows a reference point should the waveform become unrecognizable or unstable. This process can take several seconds. The Chart Update switch 176, when set to the off position, freezes the display for evaluation of the signal. The Channel # field 178 allows selection of the desired channel to be displayed on the graph. Preferred available channels are Channel 1, Index; Channel 2, Rdx/Rdy; Channel 3, Read Gate; and Trace A, a zoom on the Rdx/Rdy channel.

The Time/Div field 180 and the Volts/Div field 182 respectively set time and volts per division and the Delay % field 184 changes the trigger setting of the DAD 142 (thus moving the signal to the right). The Samples field 186 selects the number of samples that are recorded from the DAD 142. The Users Connected field 188 identifies the users connected to the software. Any nomenclature can be used, but a DNS (domain name server) hostname from the client is a preferred default.

Figure 7:
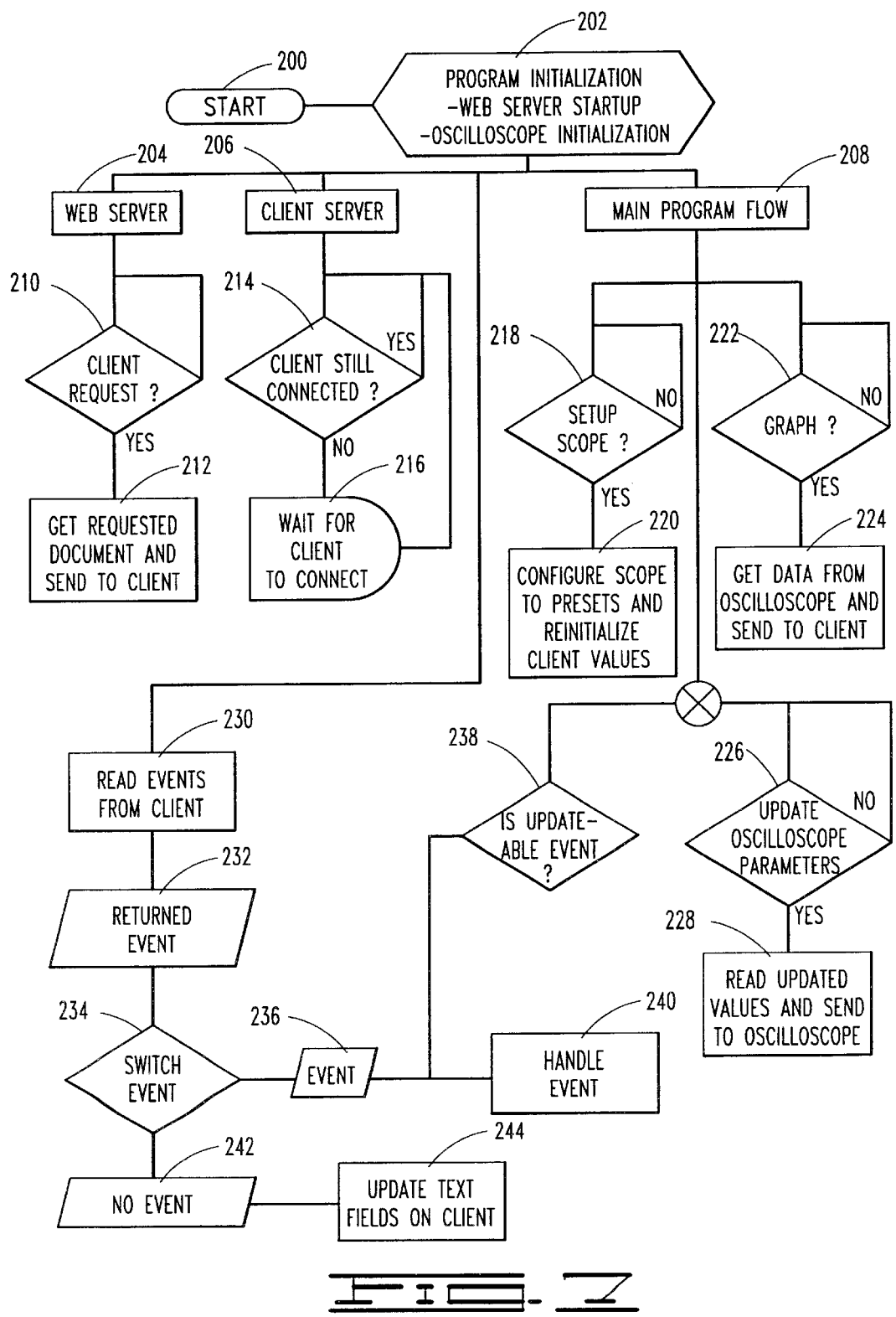
FIG. 7 is a flow chart summarizing the steps taken by the remote access system of FIG. 3.

FIG. 7 provides a generalized flow chart routine 200 to represent operation of the system 130 in accordance with the present embodiment. After program initialization at step 202, respective web server, client server and main program flow routines are concurrently executed (represented respectively at steps 204, 206 and 208).

The web server path 204 generally detects client requests (decision step 210) and gets requested documents and forwards such to the client PC 146 (step 212). The client server path 206 determines whether the client PC 146 is connected (decision step 214 and wait step 216).

The main program flow path 208 includes a number of branching operations, including a setup scope operation (steps 218 and 220), a graph enable operation (steps 222 and 224), an update parameters operation (steps 226 and 228) and a communicate with client operation flow (steps 230 through 244).

In this way, the client PC user has remote access to execution of the platform and diagnostic firmware sets and so can configure and run the drive 100 as desired. The client concurrently has full control of the DAD 142 and can configure the DAD to observe the behavior of the drive 100 in real time. The knowledge required to access and operate the serial interface with the drive 100 primarily resides in the server PC 132 (i.e., the COM module 160) and comprises the appropriate diagnostic toolbox used to carry out the various possible operations of the diagnostic firmware.

Figure 8:
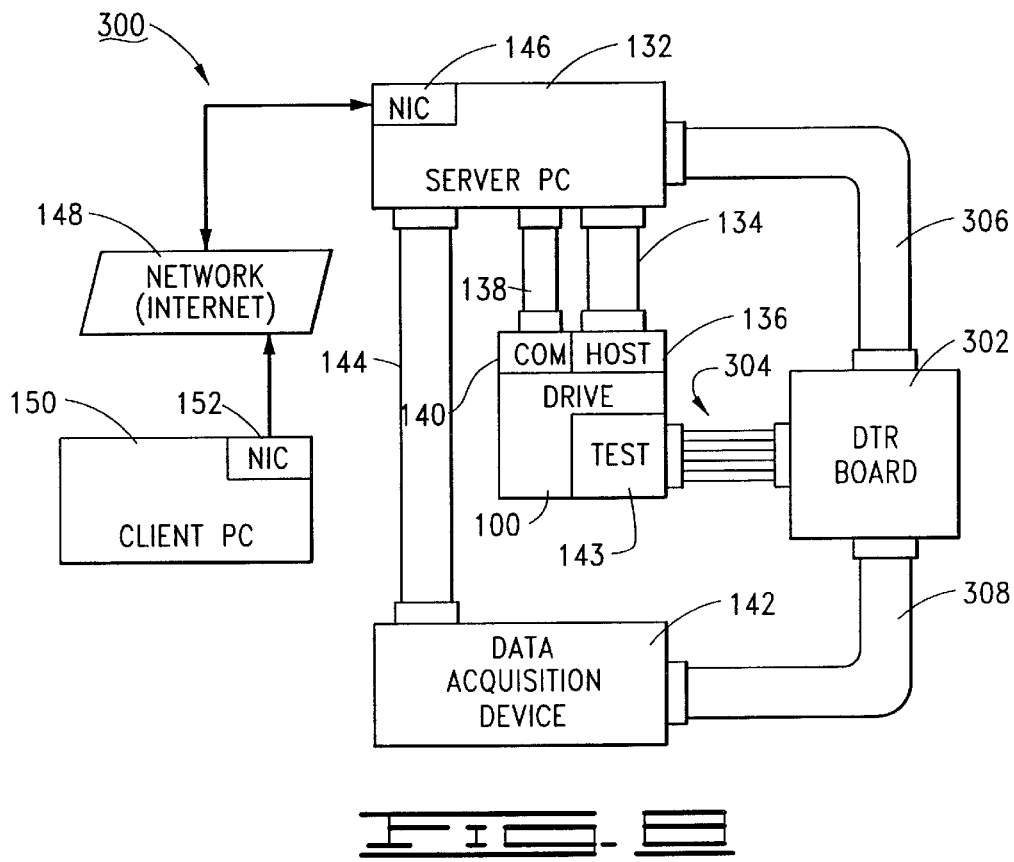
FIG. 8 is a functional block diagram of another remote access system constructed and operated in accordance with preferred embodiments of the present invention, the system of FIG. 8 including a test interface daughter board connected to test pins (nodes) of the data storage device, the data acquisition device and the server PC.

FIG. 8 shows an alternative remote access system 300 which is similar to the system 130 discussed above except that the system 300 has additional capabilities to selectively configure the interface between the DAD 142 and the disc drive 100. Like reference numerals are used in FIG. 8 for similar components previously discussed in FIG. 3.

Figure 9:
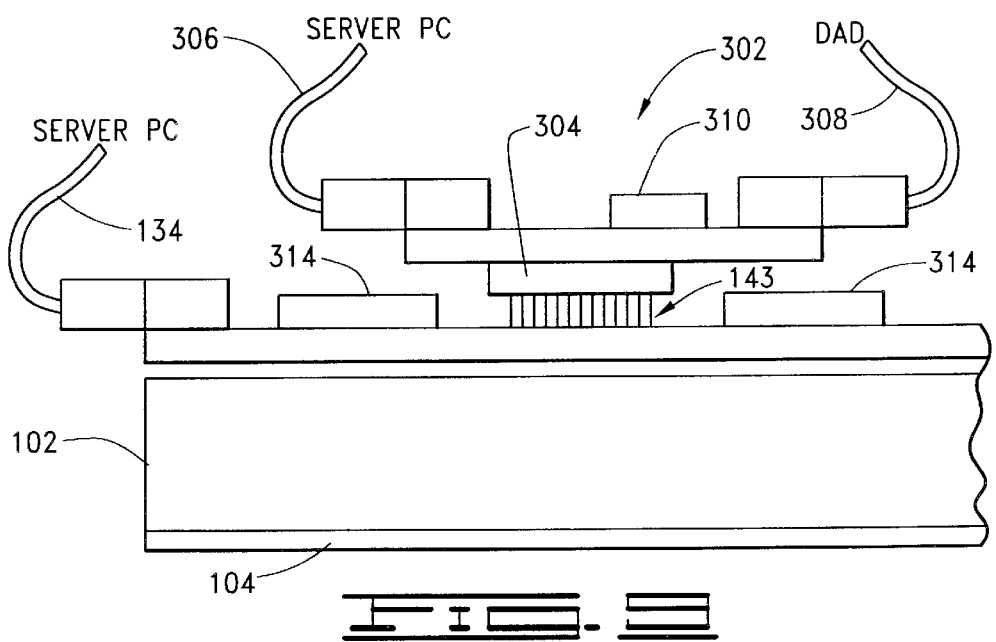
FIG. 9 shows an elevational, schematic view of the daughter board in conjunction with the data storage device.

A test interface daughter (dtr) board 302 mates with the test pins 143 of the disc drive 100 through connector 304. Communications with the board 302 from the server PC 132 are carried out through cable 306, and communications from the board 302 to the DAD 142 are provided through cable 308. FIG. 9 shows an elevational schematic representation of the board 302 in conjunction with the disc drive 100.

Figure 10:
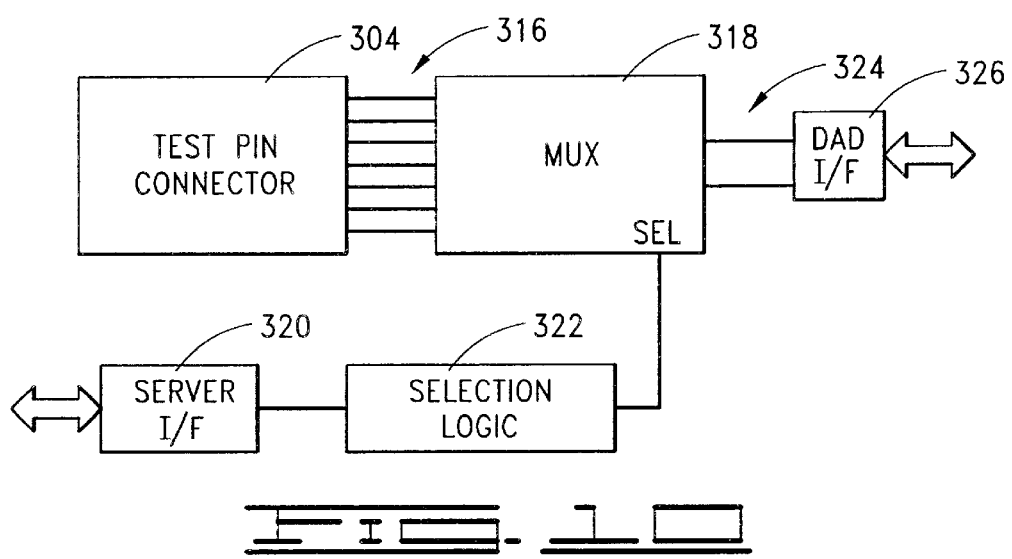
FIG. 10 is a functional block diagram of circuitry of the daughter board.

FIG. 10 shows a functional block diagram of the daughter board 302. Signal paths 316 provide individual pathways from the test pins 143 (via test pin connector 304) as inputs to a multiplexor (mux) 318. The mux 318 receives selection inputs from the server PC 132 via a server interface (I/F) circuit 320 and selection logic 322. The desired internal connections are made within the mux 318 in response to the SEL input provided by the selection logic 322 to connect output signal paths 324 to a DAD interface (I/F) circuit 326. In this way, the software on the server PC 146 (i.e., DAD command module 162, FIG. 4) can respond to the desired channel selection by the user of the client PC 150 and automatically make the desired connections to allow the DAD 142 to acquire data from the appropriate test pins 143.

FIG. 11 provides a flow chart for a REMOTE DATA ACQUISITION routine 400, generally representative of steps carried out by the remote access systems 130, 300 presented above. The client computer 150 is connected to the server computer 132 through the computer network 148 at step 402. The data storage device (disc drive 100) is connected to the server computer 132 via host interface port 136 at step 404. The DAD 142 is connected to the data storage device 100 and to the server computer 132 at step 406. This can be carried out directly, as shown in FIG. 3, or by way of the test interface daughter board 302 shown in FIG. 8.

At step 408, the server computer 132 is used to transmit a first command to the data storage device to cause the controller to execute the platform firmware. This is preferably carried out using host interface module 158 (FIG. 4) and is preferably initiated by a request from the client computer 150. Concurrently, at step 410 the client computer forwards a request to the server computer 132 to transmit a second command to the DAD 142 to capture a waveform signal from the data storage device which characterizes operation of the platform firmware in response to the first command. The second command is preferably provided through DAD command interface 162 (FIG. 4).

The waveform signal is then generated by the DAD 142 and transmitted (via DAD data interface module 164, FIG. 4) across the computer network to the client computer 150 at step 412. The process is repeated as desired until termination of the operation as shown by end block 414.

It will now be understood that the present invention, as disclosed herein and as claimed below, is generally directed to a method and apparatus for remote data acquisition in a block data storage device. In accordance with preferred embodiments, the block data storage device comprises a disc drive (such as 100) having a data storage medium (such as disc 108), a host interface port (such as 136) and a programmable controller (such as 120) with associated platform firmware and associated diagnostic firmware stored in a memory device (such as 122).

A client computer (such as 150) is connected to a server computer (such as 132) to a computer network (such as 144), preferably comprising the Internet. This step is exemplified by step 402 in FIG. 11. The data storage device is connected to the server computer via the host interface port (step 404) and a data acquisition device (such as 142) is connected to the data storage device and to the server computer (such as by step 406).

The server computer is used to transmit a first command to the data storage device to cause the controller to execute the platform firmware (such as by step 408). The client computer is concurrently used to transmit a second command to the data acquisition device to capture a waveform signal (such as shown in windows 170, 172) from the data storage device which characterizes operation of the platform firmware in response to the first command (such as by step 410). The waveform signal is then transmitted across the computer network to the client computer (such as by step 412).

The data storage device preferably further comprises a serial communication (COM) port (such as 140) connected to the server computer, and wherein the client computer further transmits a request across the network to the server computer which, in response thereto, issues a third command to the COM port to concurrently execute the diagnostic firmware. The data acquisition device comprises a digital oscilloscope so that the waveform signal comprises an oscilloscope signal obtained from the digital oscilloscope.

The data storage device is further preferably provided with a plurality of adjacent test pins (or nodes, such as 143) and a test interface daughter board (such as 302 in FIG. 8) is connected to the test pins, to the server computer and to the data acquisition device. A connection request from the client computer is then sent through the network to cause selected ones of the test pins to be electrically coupled to the data acquisition device so that the waveform signal is generated from the selected ones of the test pins.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although the embodiments described herein are directed to the remote access of diagnostic firmware in a disc drive, it will be appreciated by those skilled in the art that the process can be used in other types of data storage devices without departing from the spirit and scope of the claimed invention.

What is claimed is:

1. A method for diagnosing a remote block data storage device having a data storage medium, a host interface port and a programmable controller with associated platform firmware and associated diagnostic firmware, the method comprising:

connecting a client computer and a server computer to a computer network;

connecting the data storage device to the server computer via the host interface port;

connecting a data acquisition device to the data storage device and to the server computer;

using the server computer to transmit a first command to the data storage device to cause the controller to execute the platform firmware;

using the client computer to transmit a second command to the data acquisition device to capture a waveform signal from the data storage device which characterizes operation of the platform firmware in response to the first command; and transmitting the waveform signal across the computer network to the client computer.

2. The method of claim 1, wherein the client computer transmits a request to the server computer which, in response thereto, issues the first command to the data storage device.

3. The method of claim 1, wherein the data storage device further comprises a serial communication (COM) port connected to the server computer, and wherein the client computer further transmits a request across the network to the server computer which, in response thereto, issues a third command to the COM port to concurrently execute the diagnostic firmware.

4. The method of claim 1, wherein the data acquisition device comprises a digital oscilloscope so that the waveform signal comprises an oscilloscope signal obtained from the digital oscilloscope.

5. The method of claim 1, further comprising concurrently displaying the waveform signal on a display of the server computer and on a display of the client computer.

6. The method of claim 1, further comprising providing the data storage device with a plurality of adjacent test pins, connecting a test interface daughter board to the test pins, to the server computer and to the data acquisition device, and transmitting a connection request from the client computer through the network to cause selected ones of the test pins to be electrically coupled to the data acquisition device so that the waveform signal is generated from the selected ones of the test pins.

7. The method of claim 1, wherein the computer network comprises the Internet.

8. A system for remote data acquisition, comprising:

a client computer and a server computer interconnected through a computer network;

a block data storage device having a host interface port in communication with the server computer, a data storage medium and a programmable controller with associated platform firmware to control transfer of data between the data storage medium and the server computer;

a data acquisition device connected to at least one test node of the data storage device and connected to an interface port of the server computer, and control software loaded into a memory of the server computer and configured to, upon execution, transmit a first command to the controller to execute the platform firmware, to transmit a second command to the data acquisition device to capture a waveform signal from the data storage device which characterizes operation of the platform firmware in response to the first command, and transmit the waveform signal across the computer network to the client computer, wherein the first and second commands are issued in response to requests initiating from the client computer.

9. The system of claim 8, wherein the computer network comprises the Internet.

10. The system of claim 8, further comprising web browser software loaded into a memory of the client computer, wherein a user of the client computer issues the requests for the first and second commands to the server computer by the web browser software.

11. The system of claim 8, wherein the data storage device further comprises a serial communication (COM) port connected to the server computer and diagnostic firmware used to monitor operation of the platform firmware, and wherein the client computer further transmits a request across the network to the server computer which, in response thereto, issues a third command to the COM port to concurrently execute the diagnostic firmware.

12. The system of claim 8, wherein the data acquisition device comprises a digital oscilloscope so that the waveform signal comprises an oscilloscope signal obtained from the digital oscilloscope.

13. The system of claim 8, further configured to concurrently project the waveform signal on a display of the server computer and on a display of the client computer.

14. The system of claim 8, further comprising a test interface daughter board connected to the server computer, the data acquisition device and to a plurality of test nodes of the data storage device, the test interface daughter board housing a multiplexor and selection logic which, in response to a connection request from the client computer through the network, causes at least a selected one of the test nodes to be electrically coupled to the data acquisition device so that the waveform signal is generated from the at least one of the test nodes.

15. The system of claim 8, wherein the data storage device comprises a disc drive so that the data storage medium comprises a rigid magnetic recording disc.

16. The system of claim 8, wherein the client computer additionally issues a parametric configuration request to the server computer to set the data acquisition device to a desired parametric configuration.

* * * * *